N. Post,
Harness Hames.
Nº 3,634. Patented June 15, 1844.

UNITED STATES PATENT OFFICE.

NATHAN POST, OF MADRID, NEW YORK.

HORSE-HAME.

Specification of Letters Patent No. 3,634, dated June 15, 1844.

*To all whom it may concern:*

Be it known that I, NATHAN POST, of Madrid, in the county of St. Lawrence and State of New York, have invented a new and useful Improvement in Manufacturing Horse-Hames; and I do hereby declare that the following is a full, clear, and exact description of the construction and operation of the same, reference being had to the annexed drawings, making part of this specification.

Figure 1:
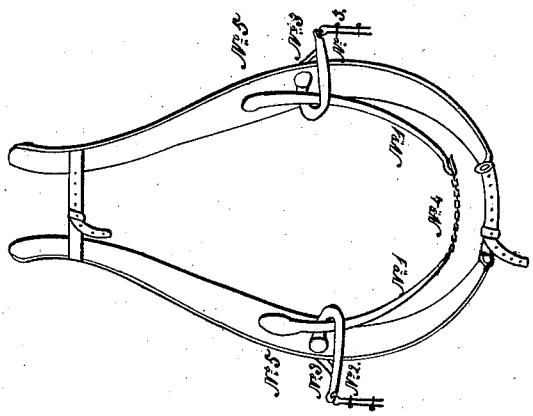

Figure 1 is a front view of the horse hames with the improvement made by me.

The hames are of the common kind now in use, and may be manufactured of wood or iron.

Figure 2:
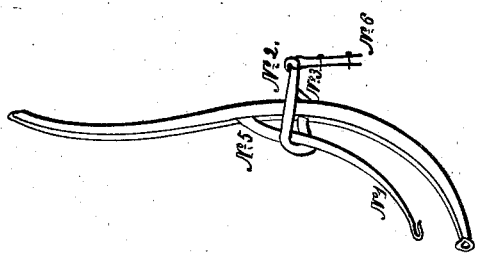

No. 1, 1, in Fig. 1 are levers attached to the front of each section of the hame at No. 5, by rivets (in form and manner as seen in Fig. 2) and pass under the draft hooks No. 2, 2, and are coupled together at No. 4 by a strap and buckle or chain and snaphook. No. 2, 2, in Fig. 1 are draft hooks inserted and riveted or otherwise fastened into the front of each section of the hames at the usual place of draft and projects forward and pass around or over the inside of the levers in the shape of a hook, and pass off beyond the hames at the distance of an inch or more from the side of the hames, and terminate with eyes, to which the clip and tug is fastened for drawing an seen at No. 6 in Fig. 2. No. 3 is a brace inserted into the side of the hame, and runs to the shank of the draft hook to support the draft hook at an inch or more from the side of the same as seen in Fig. 2.

The operation and use of the levers on the hames is to retain the hames in position as placed upon the horse collar or pad, by forming a lever purchase against the inside of the draft hooks in front of the hames, and prevent any rolling of the hames upon the collar pad, which occurs in the common hame where the draft hooks are inserted into the outer edge of the hame, and which causes so many misfortunes to horses by confining, heating and chafing the shoulders.

The operation and use of the draft hooks, is to concentrate the draft upon the front of the hames, the fore end of which being inserted or fastened upon the front of the hame and running forward and forming a hook or circle over the levers in front of the hames, I am enabled to retain the position of the hames and get a square draft against the horse collar or pad, at the same time by carrying the draft hooks out from the hames supported by the brace No. 3 as seen in Fig. 2, the tugs or chains have no chance to flatten or press the horse pad or collar inward upon the point of the shoulder of the horse, by which application of the levers and draft hooks I overcome the binding and chafing effect of the hames upon the horse pad or collar, which has always so sorely tended to confine and injure the horse. I also contemplate manufacturing horse hames with the draft hooks without the use of the levers, and apply the draft hooks in all forms in which I can retain the square draft against the horse pad or collar.

What I claim and desire to secure by Letters Patent, is—

The combination of the hook and levers with the hames substantially in the manner described.

NATHAN POST.

Witnesses:
 JNO. HORTON,
 CALEB PIERCE.